US012687884B2

(12) United States Patent (10) Patent No.: US 12,687,884 B2
Raju et al. (45) Date of Patent: Jul. 21, 2026

(54) SEPARABLE ELECTRONICS DEVICE USING A MODULAR CONNECTION DEVICE

(71) Applicant: Intel Corporation, Santa Clara, CA (US)

(72) Inventors: Prakash Kurma Raju, Bangalore (IN); Navneet Singh, Bangalore (IN); Amruta Ranade, Bangalore (IN); Ajmeer Kaja, Bangalore (IN); Jeff Ku, Taipei (TW)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 17/896,831

(22) Filed: Aug. 26, 2022

(65) Prior Publication Data

US 2022/0404862 A1 Dec. 22, 2022

(51) Int. Cl.
*G06F 1/16* (2006.01)
*H04M 1/02* (2006.01)

(52) U.S. Cl.
CPC .......... *G06F 1/1601* (2013.01); *G06F 1/1637* (2013.01); *G06F 1/1656* (2013.01); *G06F 1/1675* (2013.01); *H04M 1/0254* (2013.01); *H04M 1/0266* (2013.01)

(58) Field of Classification Search
CPC .... G06F 1/1601; G06F 1/1637; G06F 1/1656; G06F 1/1675; G06F 1/1647; G06F 1/1654; G06F 2200/1633; H04M 1/0254; H04M 1/0266; H04B 1/3888
See application file for complete search history.

(56) References Cited

U.S. PATENT DOCUMENTS

| | | | | |
|---|---|---|---|---|
| 6,266,240 | B1 * | 7/2001 | Urban ................... | G06F 1/1626 |
| | | | | 206/472 |
| 6,778,383 | B2 * | 8/2004 | Ho ........................ | G06F 1/1607 |
| | | | | 361/679.04 |
| 8,059,039 | B2 * | 11/2011 | Ayala Vazquez .... | H01Q 1/2266 |
| | | | | 343/702 |
| 9,069,523 | B2 * | 6/2015 | Hayashida ............ | G06F 1/1607 |
| 9,253,379 | B2 * | 2/2016 | Lam ...................... | G06F 1/1654 |

(Continued)

OTHER PUBLICATIONS

Tru-Zip, Truzip waterproof Tech Specs, 2019, Tru-Zip.com, https://web.archive.org/web/20200928030656/http://tru-zip.com/wp-content/uploads/2019/01/TRU-Zip-4mm-6mm-8mm.pdf (Year: 2019).*

(Continued)

*Primary Examiner* — Allen L Parker
*Assistant Examiner* — Martin Antonio Asmat Uceda
(74) *Attorney, Agent, or Firm* — Hanley, Flight & Zimmerman, LLC

(57) ABSTRACT

Apparatus, systems, and articles of manufacture for separable electronic devices are disclosed. A separable electronics device includes a first panel having a first zipper component, the first panel including a front housing, display cover glass, a display panel, display electronics, and a first panel-panel interface. The separable electronics device further includes a second panel having a second zipper component, the second panel including a back housing, and a second panel-panel interface, wherein the first panel and the second panel are physically coupled by a mechanical connection of the first zipper component and the second zipper component.

20 Claims, 10 Drawing Sheets

(56) References Cited

U.S. PATENT DOCUMENTS

| | | | | |
|---|---|---|---|---|
| 2004/0209018 A1* | 10/2004 | Lookholder | ............. | A61G 1/01 |
| | | | | 428/33 |
| 2008/0310094 A1* | 12/2008 | Burns | ................... | G06F 1/1601 |
| | | | | 361/679.01 |
| 2014/0366336 A1* | 12/2014 | Chung | ................... | A44B 19/16 |
| | | | | 24/389 |
| 2015/0311939 A1* | 10/2015 | Zalon | ................... | H04B 1/3888 |
| | | | | 455/575.6 |
| 2017/0235338 A1* | 8/2017 | Wong | ................... | H04B 1/3888 |
| | | | | 361/679.3 |

OTHER PUBLICATIONS

Silver Bobbin, "19 Different Types of Zippers for Garments [Complete Guide]," retrieved from https://silverbobbin.com/different-types-of-zippers/ on Jun. 20, 2022, 18 pages.

* cited by examiner

400

430

420

440                    440

410

SEPARABLE ELECTRONICS DEVICE USING A MODULAR CONNECTION DEVICE

FIELD OF THE DISCLOSURE

This disclosure relates generally to electronic equipment and, more particularly, to computer displays.

BACKGROUND

Electronic equipment that includes multiple components, especially those in computers and computer displays, are typically glued together or coupled via a plurality of screws. In order to separate the components, the use of a hot gun to melt the glue or the use of a screwdriver is needed. Other electronic components may require any number of external tools to separate pieces that are glued together, coupled via a plurality of screws, or any other mechanism that couples two or more electronic components.

Figure 1:
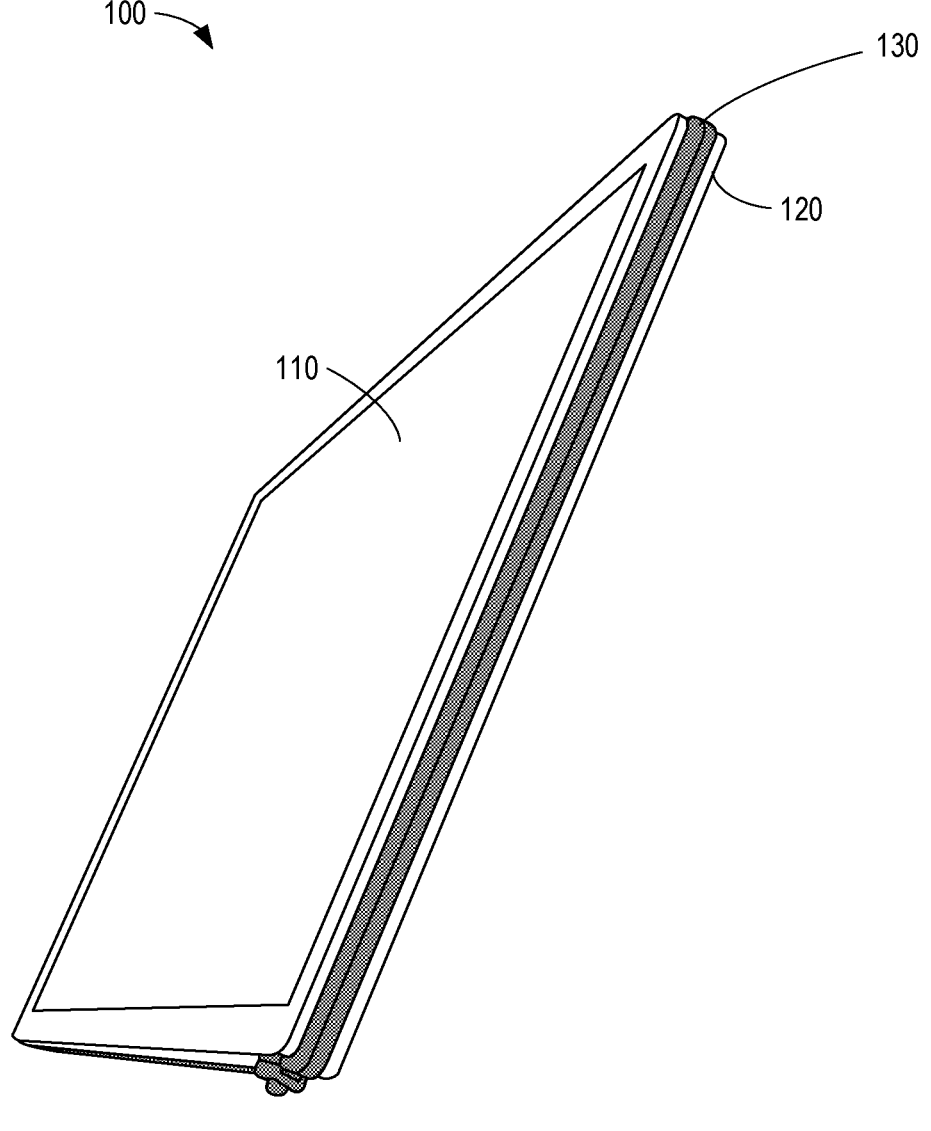
FIG. 1 depicts an example separable electronics device including an example modular connection device.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Current electronics devices are typically complex to manufacture and/or assemble. For example, a device and/or a component thereof (e.g., a housing) might not be able to be machined from a single piece of material. In such an example, the device will typically use multiple components that are connected together using a non-repairable connection such as, for example, glues, adhesives, breakable clips, screws, etc. When attempting to repair such a device, there is a heightened risk that one or more of the components will be permanently destroyed and/or rendered inoperable. For example, in a mobile device (e.g., a cell phone, a tablet, etc.), repair of a damaged screen might involve heating an adhesive and bending of the screen that might cause further damage to the screen. In most cases, electronic equipment that is damaged during the repair process is no longer usable.

Each year, the total amount of electronic equipment grows by about 2.5 million tons. The increase in demand for electronic equipment results in an increase in electronic waste (e-waste). Only about 17% of electronics materials are recycled and, as a result, there is an exponential increase in global e-waste.

Repairability of electronic equipment is vital to reduce the global e-waste. One major source of electronic waste among electronic computers is display panels. In current designs, when the display panel goes bad the whole computer display package needs to be fully disassembled. During disassembly, complications frequently arise where a portion of or all of the display package is damaged, contributing to e-waste further since the damaged display package can no longer be used and cannot be recycled.

To make the products more sustainable, example approaches disclosed herein utilize a zipper-based electronic equipment panel assembly, with particular emphasis to the computer display package, which provides a 100% modular and/or replaceable off the shelf display package and creates a significantly easier repairability profile to reduce the discarded portions of a display package.

FIG. 1 depicts an example separable electronics device 100. The example separable electronics device 100 includes a first panel 110, a second panel 120, and an example modular connection device 130. In some examples, a first portion of the components of the example modular connection device 130 is/are included on the first panel 110, and a second portion of the components of the example modular connection device 130 is/are included on the second panel 120. As illustrated in FIG. 1, the first panel 110 and second panel 120 are coupled via the example modular connection device 130. In some examples, the example modular connection device 130 may include zipper components.

Figure 2:
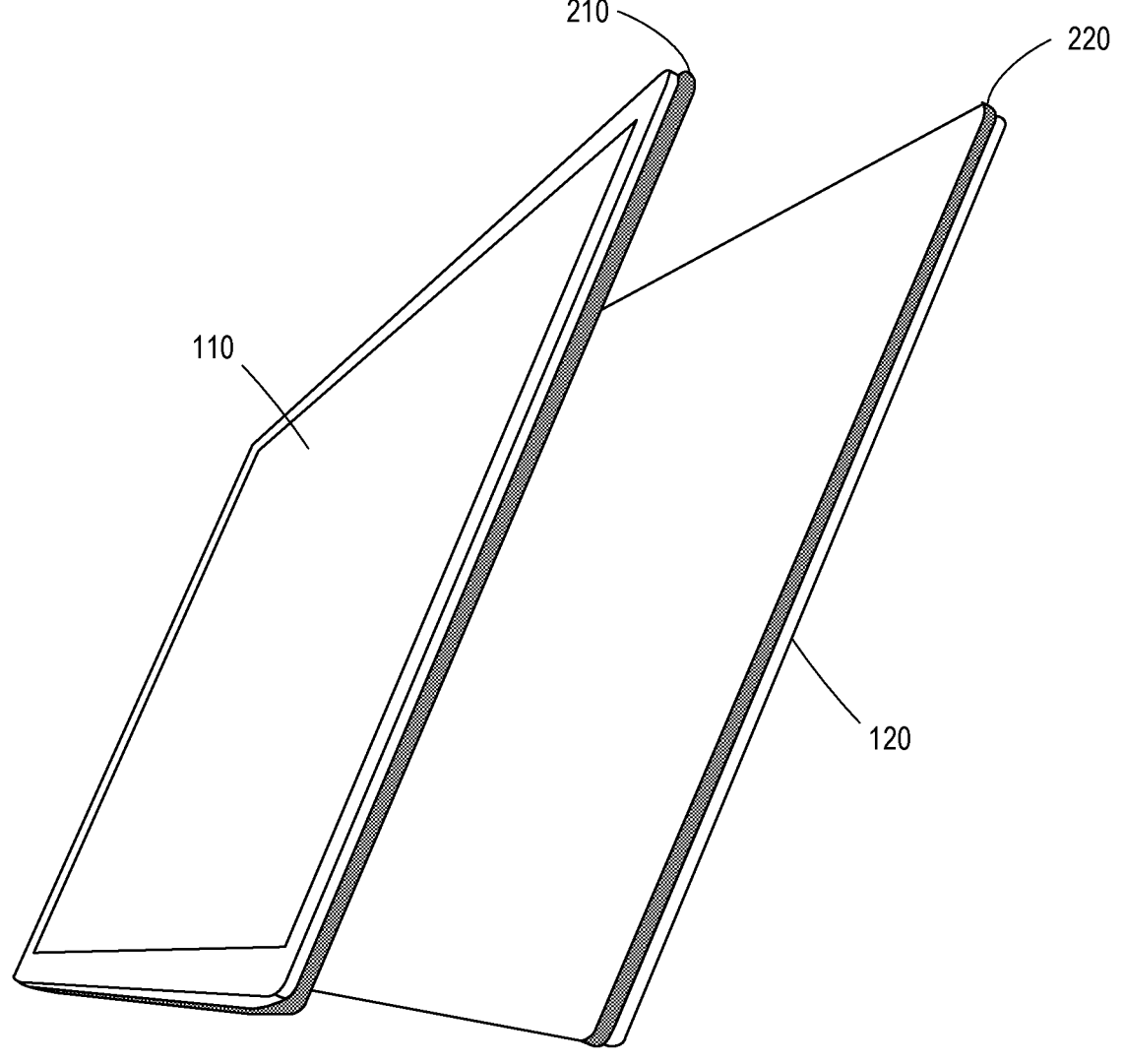
FIG. 2 depicts an exploded view of the example separable electronics device of FIG. 1.

FIG. 2 depicts an exploded view of the example separable electronics device 100 of FIG. 1. The example separable electronics device 100 of FIG. 2 includes the first panel 110, a first zipper component 210, the second panel 120, and a second zipper component 220. In some examples, the first zipper component 210 is coupled to the first panel 110 and the second zipper component 220 is coupled to the second panel 120. The first zipper component 210 can be operably coupled with the second zipper component 220 (collectively forming the example modular connection device 130).

In some examples, all of the example modular connection device 130 may be coupled to the first panel 110. In this example, the example modular connection device 130 may then couple to the second panel 120 to form the example separable electronics device 100 of FIG. 1. Alternatively, in some examples, all of the example modular connection device 130 may be coupled to the second panel 120. In this example, the example modular connection device 130 may then couple to the first panel 110 to form the example separable electronics device 100 of FIG. 1.

In some examples, the first panel 110 and/or the second panel 120 is a replacement panel for the example separable electronics device 100 of FIG. 1. In this configuration, if either, or both, of the first panel 110 and/or the second panel 120 are damaged, they can be replaced individually without the need to discard the entire example separable electronics device 100.

Figure 3A:
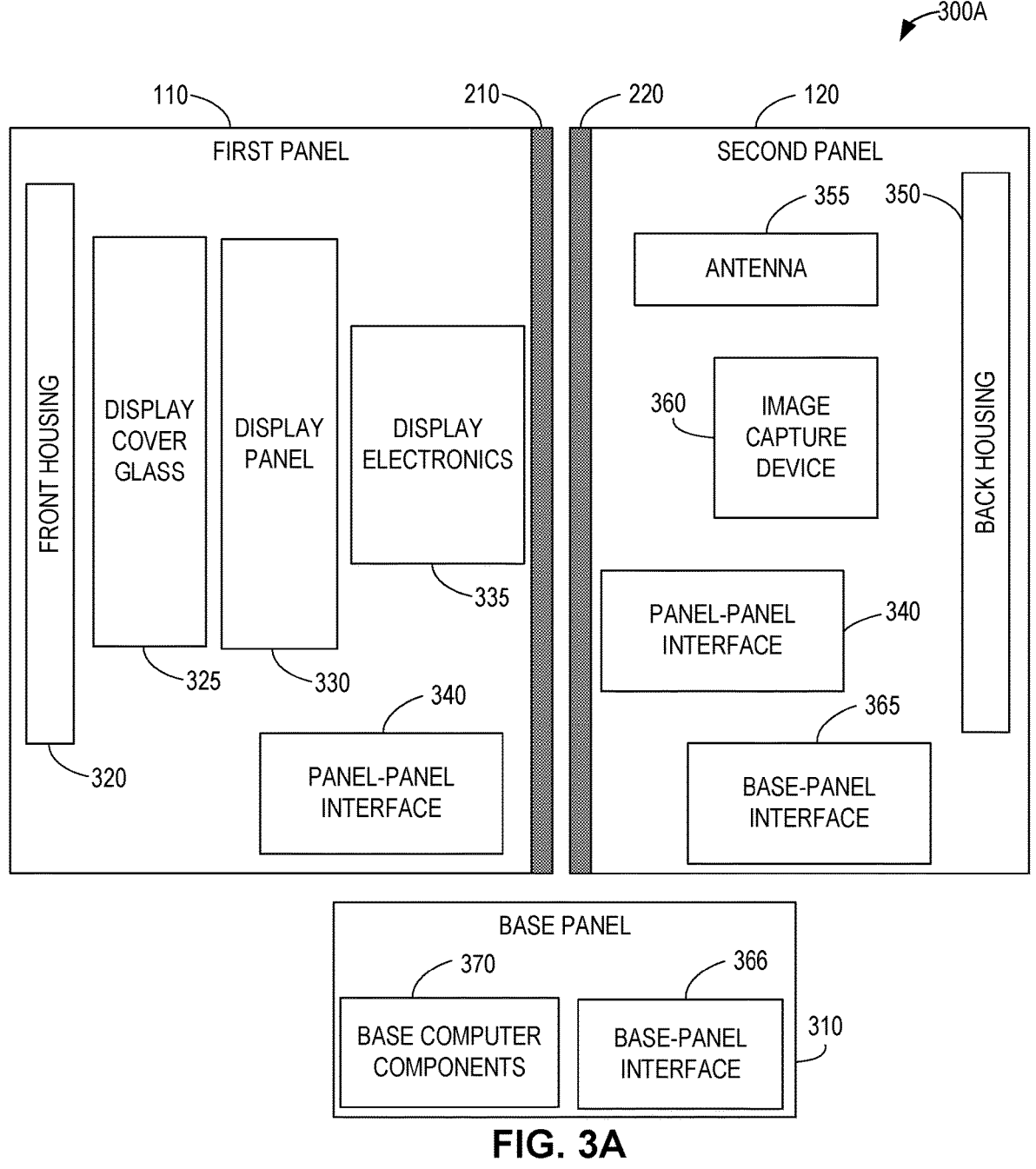
FIG. 3A is a block diagram of an example configuration of electronic components within the separable electronics device of FIG. 1.

FIG. 3A is a block diagram of an example configuration of electronic components 300A within the separable electronics device 100 of FIG. 1. The example block diagram of FIG. 3A represents a clamshell-style laptop configuration. As illustrated in FIG. 3A, the example configuration of electronic components 300A includes the first panel 110, the second panel 120, and a base panel 310. The example first panel 110 includes a front housing 320, display cover glass 325, a display panel 330, display electronics 335, a panel-panel interface 340, and the first zipper component 210. The example second panel 120 includes the panel-panel interface 340, a back housing 350, an antenna 355, an image capture device 360, a base-panel interface 365, and the second zipper component 220. The example base panel 310 includes base computer components 370.

In some examples, the front housing 320 creates a protective cover for the display cover glass 325, display panel 330, display electronics 335, and panel-panel interface 340. The front housing 320 may be made of aluminum, plastic, or any other type of material that may be used in laptop/computer style configurations.

In some examples, the display cover glass 325 creates an additional protective cover for the display panel 330. The display cover glass 325 may be made of a touch-sensitive glass material to allow for finger control of the display panel 330, a standard glass cover to serve as a protective cover, or any other kind of material that may be used to cover display panel in laptop/computer style configurations.

In some examples, the display panel 330 may include any configuration of components that is needed to display an image, which may include light-emitting diodes (LEDs), liquid crystals, a reflector sheet, etc. The display electronics 335 controls the image output to the display panel 330 by controlling the individual components within the display panel 330 such as modifying power output, which LEDs to illuminate, etc., and also includes a mechanism for communicating with the panel-panel interface 340.

In some examples, the panel-panel interface 340 of the first panel 110 provides an electrical connection between the first panel 110 and the second panel 120 by interfacing with the panel-panel interface 340 of the second panel 120. This electrical connection may be used to communicate information to and from the second panel 120 pertinent to computer operation. The panel-panel interface 340 of the first panel 110 may be accomplished using any kind of electrical connection mechanism, which may include wires, pogo pins, magnetic force connectors, etc.

In some examples, the back housing 350 of the illustrated example of FIG. 3A creates a protective cover for the panel-panel interface 340, the antenna 355, the image capture device 360, and the base-panel interface 365. The back housing 350 may be made of aluminum, plastic, or any other type of material that may be used in laptop computer style configurations.

The antenna 355 may include any number of omnidirectional and/or directional antennas designed to send/receive wireless electronic/waveform signals which may include, but is not limited to, Bluetooth, Wi-Fi, etc. Each signal sent and/or received from the antenna 355 may be sent and/or received via any one of or combination of radio frequency (RF) transceivers, fiber-optic transceivers, ethernet transceivers, and/or wireless access point (WAP) transceivers.

The image capture device 360 may include any number of image capture components which may include, but is not limited to, camera sensors, a lens, a shutter, a camera controller board, etc. In some examples, the image capture device 360 may be removed from the second panel 120 via a separate modular connection device 130. Further information on this configuration is described in connection with FIG. 9.

In some examples, the panel-panel interface 340 of the second panel 120 provides an electrical connection between the second panel 110 and the first panel 120 by interfacing with the panel-panel interface 340 of the first panel 110. This electrical connection may be used to communicate information to and from the first panel 110 pertinent to computer operation. The panel-panel interface 340 of the second panel 120 may be accomplished using any kind of electrical connection mechanism, which may include wires, pogo pins, magnetic force connectors, etc.

In some examples, the base-panel interface 365 provides an electrical connection between the base computer components 370 of the base panel 310 and the second panel 120. This electrical connection may allow the base-panel interface 365 to send/receive information to/from the base computer components 370 of the base panel 310. In some examples, the electrical connection between the base-panel interface 365 and the base computer components 370 may include a wired connection, but may also include another form of electrical connection such as pogo pins, magnetic connectors, etc.

In some examples, the base panel 310 includes a second base-panel interface 366 to enable components (e.g., base computer components 370, auxiliary components 380, etc.) to communicate between the base panel 310 and the second panel 120. While in the illustrated example of FIGS. 3A and/or 3B, the base-panel interface 365, 366 is used to interconnect the base panel 310 and the second panel 120, in some examples, the base-panel interfaces may be implemented between the base panel 310 and the first panel 110.

In some examples, the base-panel interface 365 may also include a mechanical connection to connect the second panel 120 to the base panel 310. The mechanical connection may include any number, or combination of, hinges, clamps, springs, screws, magnets, etc.

In some examples, the base computer components 370 may include any combination of components of a computing device such as a central processing unit (CPU), a storage device (such as a hard disk drive (HDD), a solid-state drive (SSD), etc.), random access memory (RAM), a graphical processing unit (GPU), etc.

Figure 3B:
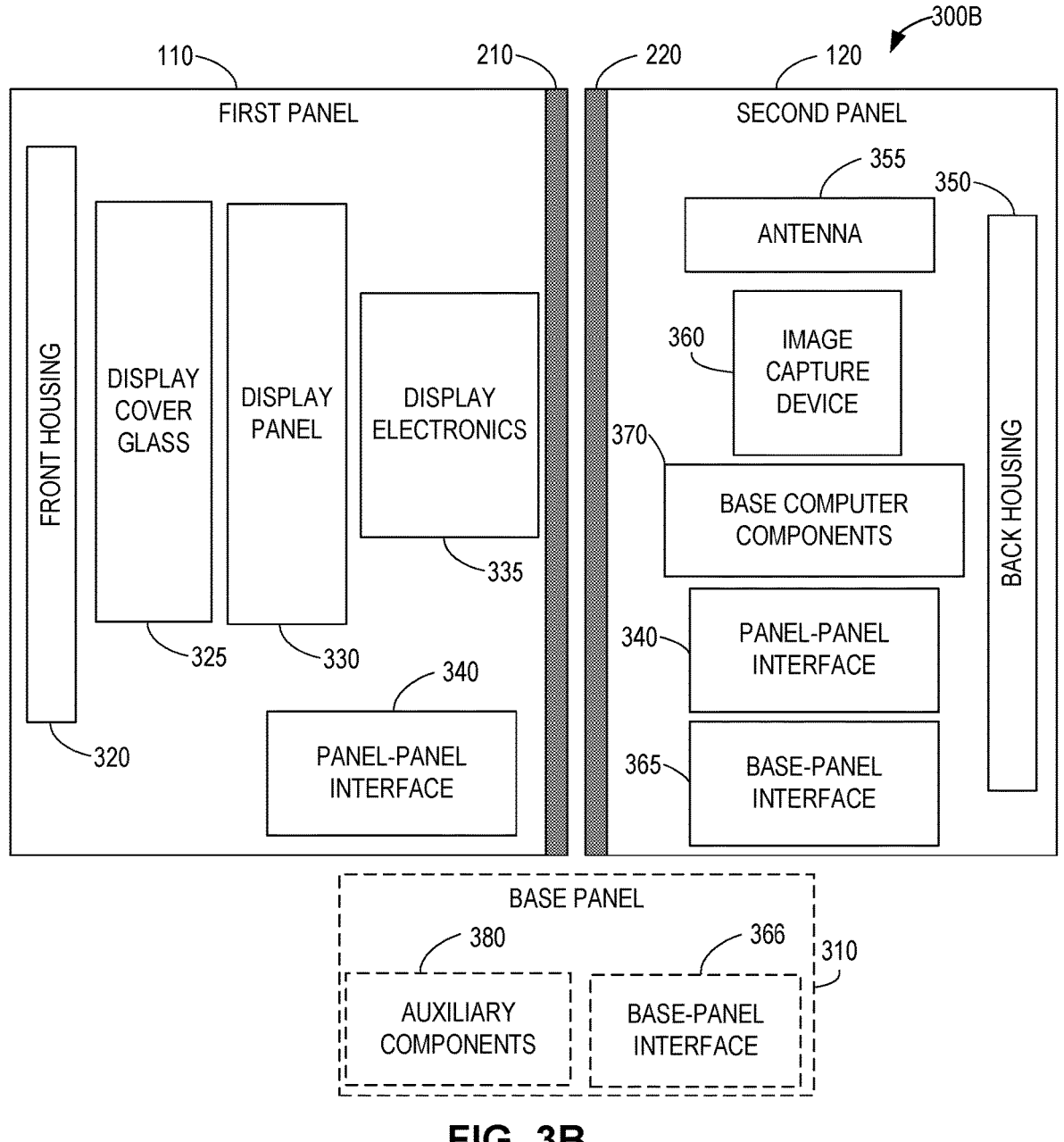
FIG. 3B is an alternative block diagram of an example configuration of electronic components within the separable electronics device of FIG. 1.
Figure 6:
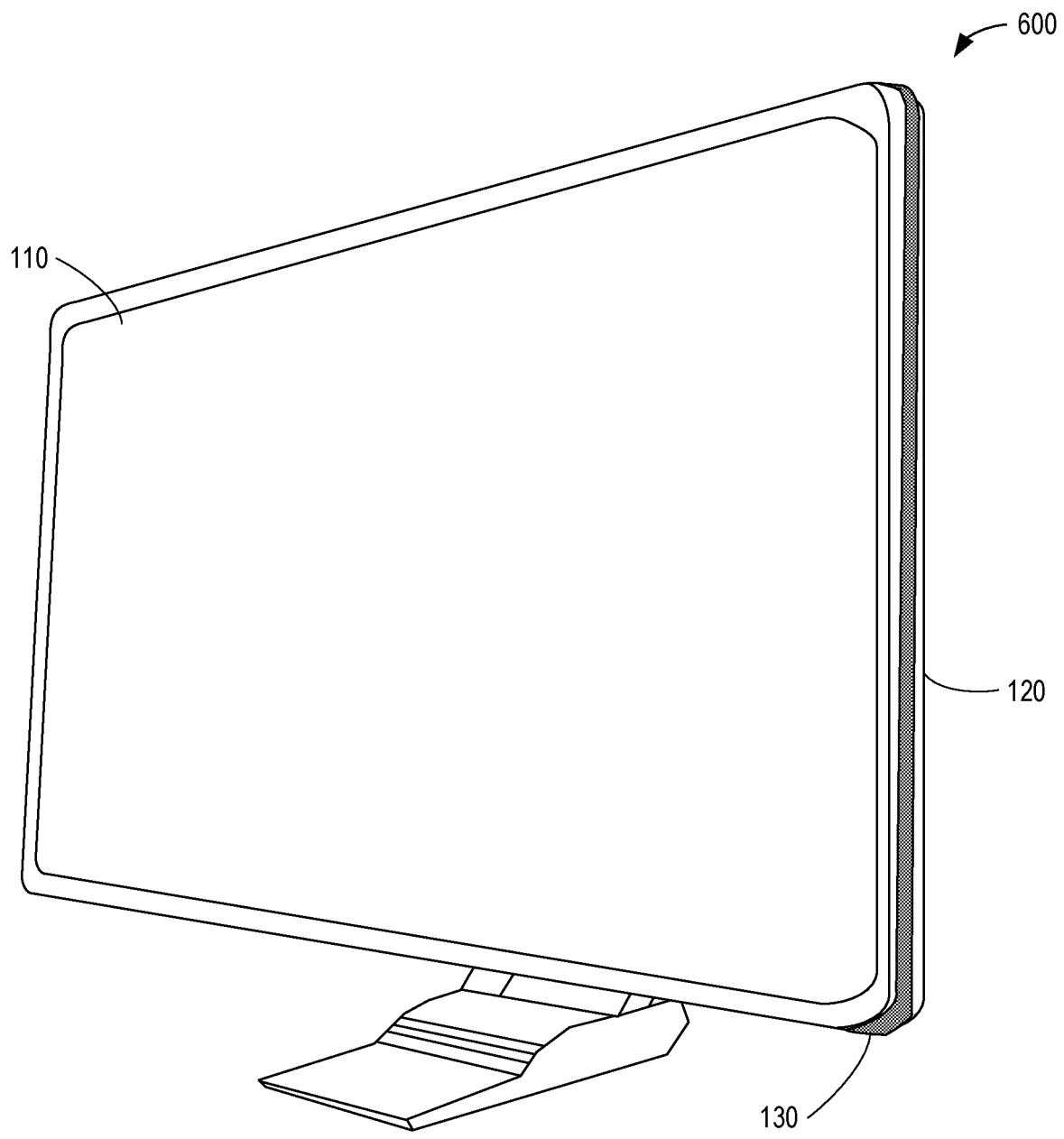
FIG. 6 depicts an example alternative implementation of the example electronics device of FIG. 1 using the example modular connection device of FIG. 4.

FIG. 3B represents an alternative block diagram of an example configuration of electronic components within the separable electronics device of FIG. 1. In the alternate example 300B, the base computer components 370 are included in the second panel 120. In some examples, the base-panel interface 340 of the second panel interfaces directly with the base computer components 370 through the base-panel interface 365 without going through the base panel 310. The illustrated example of FIG. 3B represents a tablet device, which is illustrated in FIG. 1, or an All-in-One desktop computer, which is illustrated in FIG. 6.

In some examples, the base panel 310 may be optionally connected to the second panel 120 via the base-panel interface 365. In such an example, the base panel 310 may include auxiliary components 380 which may include, but is not limited to, a keyboard, trackpad, batteries, sensors (such as a fingerprint sensor), mouse, etc. In some examples, the base panel 310 may be operably and/or mechanically connected to the second panel 120 via the base-panel interface 365 through a connection mechanism which may include pogo pins, a universal serial bus (USB) connection, magnetic connectors, etc.

Figure 4:
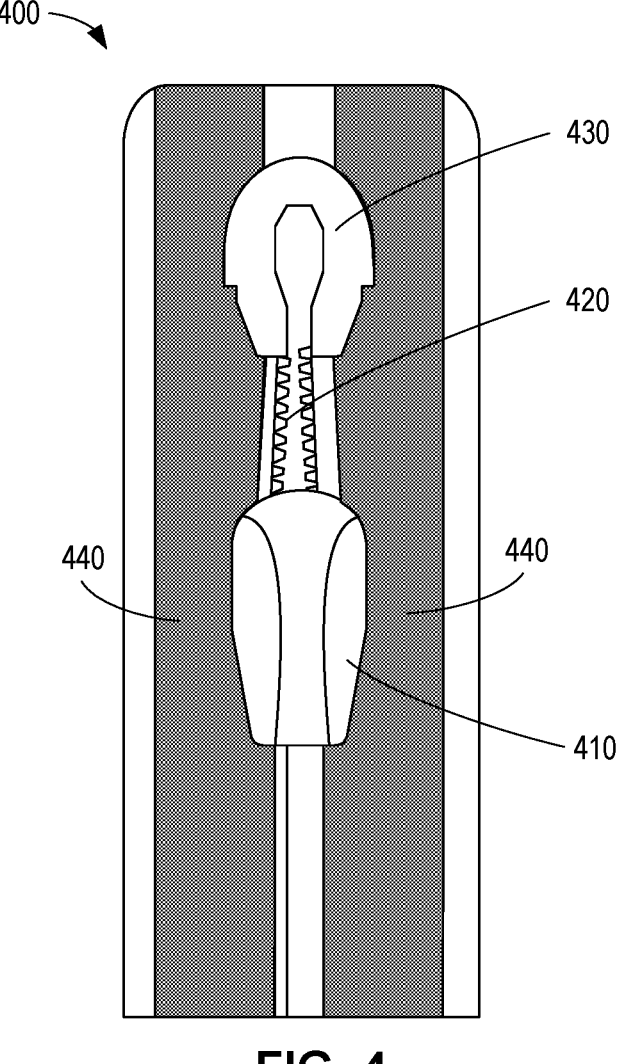
FIG. 4 depicts an example implementation of the example modular connection device of FIG. 1.

FIG. 4 depicts an example modular connection device 130 of the example separable electronics device 100 of FIG. 1. As illustrated in FIG. 4, the example modular connection device 130 is an example zipper 400 which includes a slider 410, a plurality of teeth 420, a slider stop mechanism 430, and a connection flange 440.

The slider 410 of the example zipper 400 of FIG. 4 provides a mechanism for opening and closing the example zipper 400. The slider 410 opens/closes the example zipper 400 by detaching/interlocking the plurality of teeth 420 when the slider 410 is displaced. In some examples, when the slider 410 is displaced in one direction, the plurality of teeth 420 interlock and when the slider 410 is displaced in the opposite direction, the plurality of teeth 410 detach. In some examples, the example zipper 400 may include more than one slider 410. The slider 410 may be made of any combination of materials that may include, but is not limited to, metal (such as brass, aluminum, zinc, etc.), plastic, nylon, etc.

Since manufacturers provide warranties to accompany their products, manufacturers design computer components in a way that users cannot easily void a warranty. One way to avoid voiding of a warranty of the example modular connection device 130 is to provide the ability to prohibit voidable activities, such as decoupling of separable components, without an appropriate key (e.g., a zipper slider). Thus, in some examples, the slider 410 may decouple from the example zipper 400. In this example, the slider 410 decoupling from the example zipper 400 enables locking of the modular connection device 130 to protect the electronic components housed within the example separable electronics device 100.

The plurality of teeth 420 of the example zipper 400 of FIG. 4 provides a mechanism for coupling the first panel 110 and the second panel 120. The teeth 420 detach/interlock when the slider 410 is displaced in a perpendicular direction to the plane of the interlocking mechanism of the teeth 420.

The teeth 420 may be made of any combination of materials that may include, but is not limited to, metal (such as brass, aluminum, zinc, etc.), plastic, nylon, etc.

In some examples, the example zipper 400 may include a slider stop mechanism 430. The slider stop mechanism 430 of the example zipper 400 of FIG. 4 provides a mechanism to prevent the slider 410 from unintentionally decoupling from the example zipper 400. In some examples, the slider stop mechanism 430 may include a starter box and/or an insertion pin where the insertion pin is inserted into the starter box to allow for the plurality of teeth 420 to be detached/interlocked via the displacement of the slider 410.

The connection flange 440 of the example zipper 400 of FIG. 4 provides a mechanism to couple the example zipper 400 to the first panel 110 and/or the second panel 120. In some examples, the connection flange 440 may include tape on one side for coupling the connection flange 440 to the first panel 110 and/or the second panel 120. Alternatively, or additionally, any other form of adhesive material and/or coupling mechanism may be used on one side of the connection flange 440 to couple the connection flange 440 to the first panel 110 and/or the second panel 120.

In some examples, the connection flange 440 may include a mechanism for creating a waterproof seal around the plurality of teeth 420. One such method is to utilize a TRU® waterproof zipper, which is made of a carbon reinforced nylon material and provides an IP67 waterproof/dustproof rating.

In some examples, the plurality of teeth 420 and/or the connection flange 440 provides a mechanism for allowing air flow to/from the electronic components housed within the example separable electronics device 100. One such mechanism may include a mesh filter disposed on the side of the connection flange 440 that couples to the first panel 110 and/or the second panel 120 which spans the geometric gap between the first panel 110 and the second panel 120 (where the slider 410 and teeth 420 are located). The mesh filter allows air flow to the electronic components while keeping undesirable dust/debris particles out. The mesh filter may be made of a fine nylon or a coarse plastic, but is not limited to just those two materials.

Figure 5:
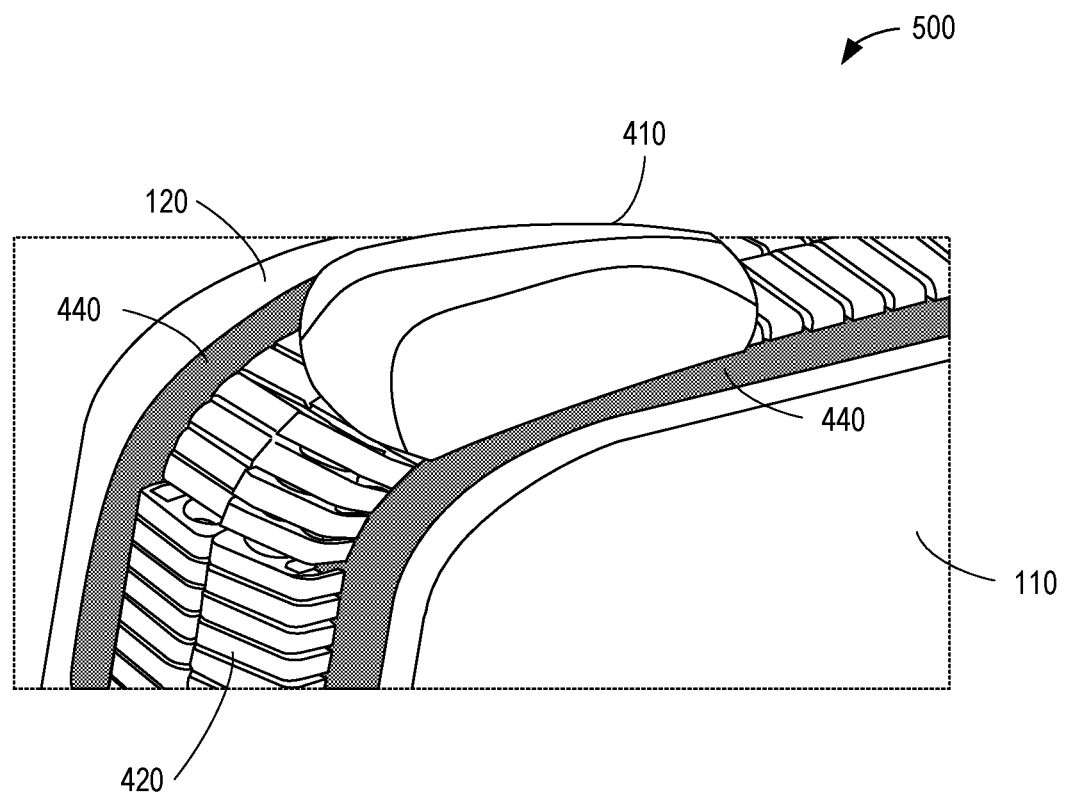
FIG. 5 depicts a close-up view of the example modular connection device of FIG. 4 as used on the example separable electronics device of FIG. 1.

FIG. 5 depicts a close-up view of the example zipper 400 of FIG. 4 representing the example modular connection device 130 of FIG. 1. As illustrated in FIG. 5, a portion of the connection flange 440 may couple with the first panel 110 and another portion of the connection flange 440 may couple with the second panel 120. The slider 410 detaches/interlocks the teeth 420 to create the example separable electronics device 100. In some examples, the connection flange 440, as described above, may couple to the first panel 110 and/or the second panel 120 via an adhesive mechanism on one side of the connection flange.

FIG. 6 depicts an alternative example implementation of the example separable electronics device 100 of FIG. 1. In the illustrated example of FIG. 6, the base computer components 370 are disposed between the first panel 110 and the second panel 120, with the base computer components 370 including any form of auxiliary communication mechanisms (e.g., universal serial bus (USB), audio jack, high definition multimedia interface (HDMI), etc.). This example represents an All-in-One Computer assembly device in accordance with the illustrated block diagram of FIG. 3B, where the display, computer, and display stand are all included in one device.

Figure 7:
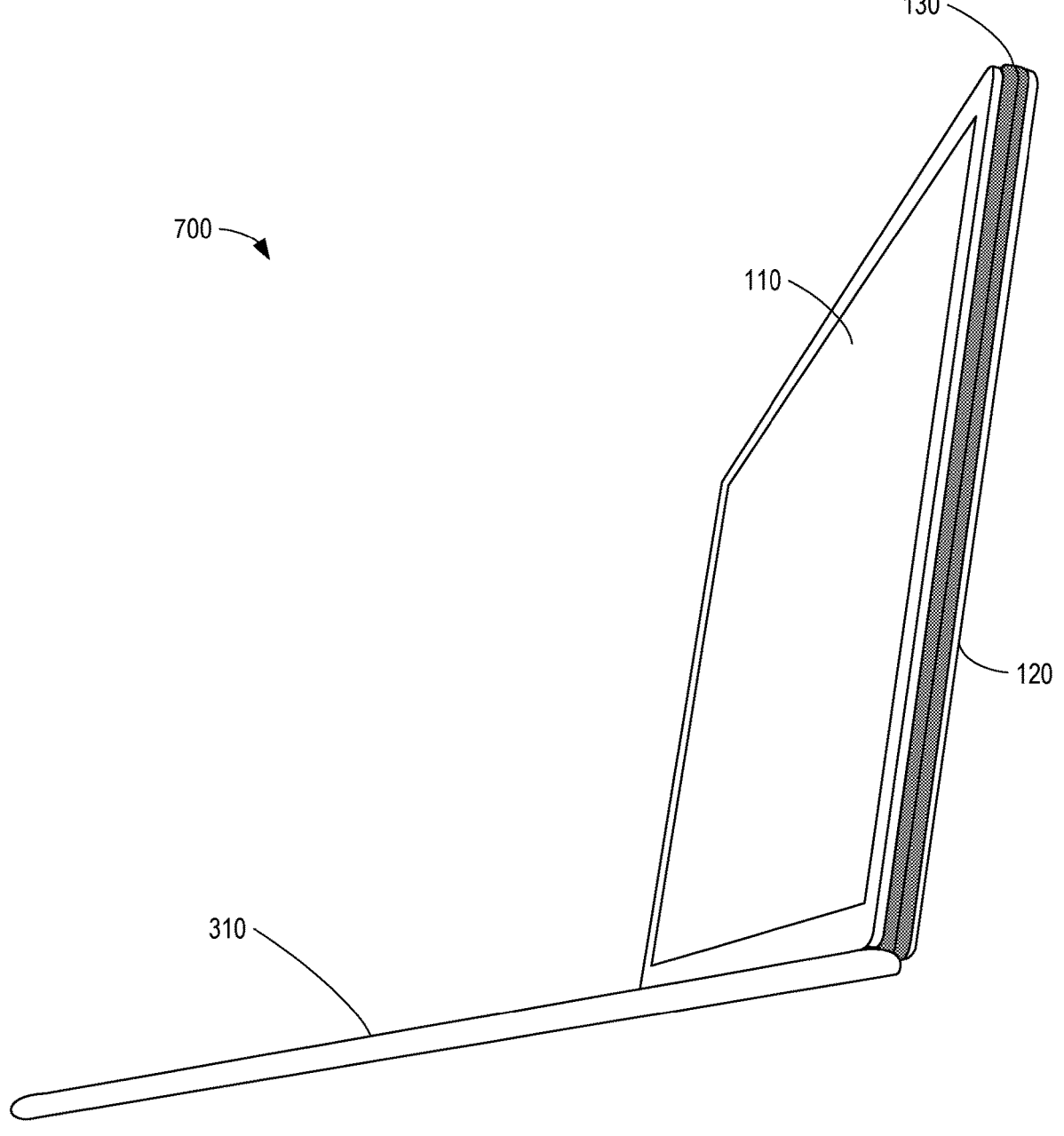
FIG. 7 depicts another example implementation of the example electronics device of FIG. 1 using the example modular connection device of FIG. 4.

FIG. 7 depicts another alternative implementation of the example separable electronics device 100 of FIG. 1. In the illustrated example of FIG. 7, the base computer components 370 are included in the base panel 310 and disposed in a clamshell orientation with respect to the first panel 110 and the second panel 120, where the base computer components 370 are operably connected to the second panel 120 through the base-panel interface 365. This example represents a clamshell laptop configuration in accordance with the illustrated block diagram of FIG. 3A. However, any other type of orientation and/or hinge may additionally or alternatively be used.

Figure 8:
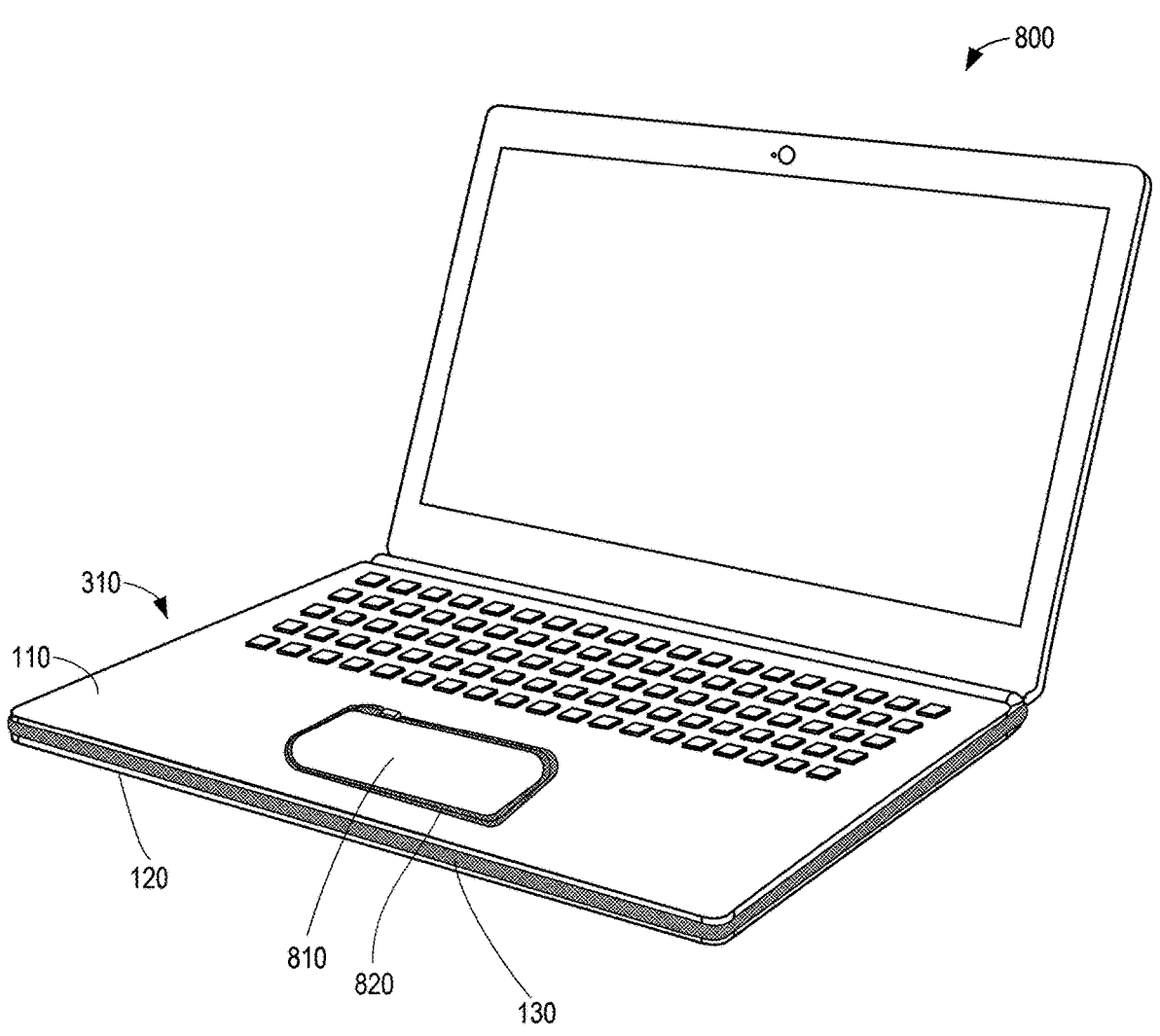
FIG. 8 depicts an alternative laptop configuration utilizing the example modular connection device of FIG. 1.

FIG. 8 depicts an alternative laptop configuration 800 that may utilize the example modular connection device 130 of FIG. 1. In some examples, the base panel 310 may include its own first panel 110 and second panel 120. In some examples, the first panel 110 and the second panel 120 of the base panel 310 may couple via the modular connection device 130. In this example, the modular connection device 130, which is illustrated as the zipper 400, may circumvent the base panel 310 to allow for repairability and/or replaceability of components stored therein.

In some examples, the alternate laptop configuration 800 includes a trackpad 810 which may also be coupled to the base panel 310 via an example modular connection device 820. In this example, the modular connection device 820, which is illustrated as the zipper 400, may be placed around the entire trackpad perimeter to allow for removal and/or replacement of the trackpad or the components stored therein.

Figure 9:
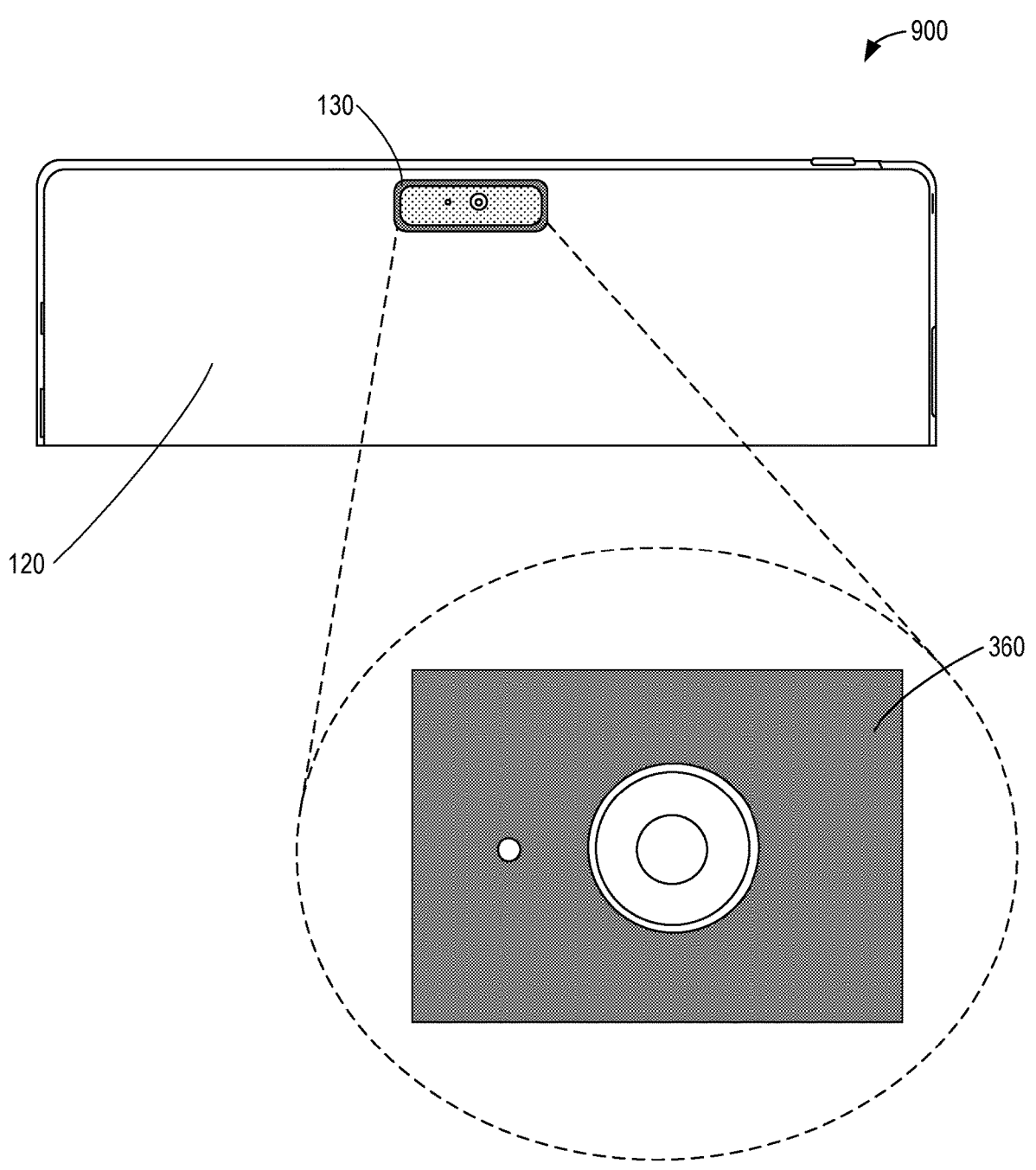
FIG. 9 depicts an example electronic component that may utilize the example modular connection device of FIG. 1.

FIG. 9 depicts an example electronic component that may utilize the example modular connection device 130 of FIG. 1. The illustrated example of FIG. 9 represents an alternative image capture device configuration 900. In some examples, the image capture device 360 may be separable from the second panel 120 via the modular connection device 130. In this example, the modular connection device 130, which is illustrated as the zipper 400, may be placed around the image capture device 360 and used to unzip the entirety of the image capture device 360 from the second panel 120 for repairability and/or replaceability purposes.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, apparatus, and articles of manufacture have been disclosed that provide a separable electronics device with a modular connection that will reduce e-waste by reducing damage during disassembly of electronic equipment.

Example apparatus, systems, and articles of manufacture for separable electronic devices are disclosed herein. Further examples and combinations thereof include the following:

Example 1 includes a separable electronics device comprising, a first panel having a first zipper component, the first panel including a front housing, display cover glass, a display panel, display electronics, and a first panel-panel interface, and a second panel having a second zipper component, the second panel including a back housing, and a second panel-panel interface, wherein the first panel and the second panel are physically coupled by a mechanical connection of the first zipper component and the second zipper component.

Example 2 includes the separable electronics device of example 1, wherein the second panel further includes an antenna, an image capture device, and a base-panel interface.

Example 3 includes the separable electronics device of example 2, wherein the base-panel interface enables electronic and mechanical communications between a base panel and the second panel.

Example 4 includes the separable electronics device of example 1, wherein the first zipper component and the second zipper component form a waterproof seal around the separable electronics device when mechanically connected.

Example 5 includes the separable electronics device of example 1, wherein the separable electronics device is a computer display.

Example 6 includes the separable electronics device of example 1, wherein the first panel-panel interface and the second panel-panel interface, when electrically coupled, enable electronic communications between the first panel and the second panel.

Example 7 includes the separable electronics device of example 1, wherein the second panel further includes a base computer component including at least one of a memory, a storage device, a hardware processor, or a graphics processing unit.

Example 8 includes the separable electronics device of example 7, wherein the base computer component is in communication with a base-panel interface of the second panel.

Example 9 includes the separable electronics device of example 1, wherein the second panel further includes a first base-panel interface, and further including a base panel including a base computer component including at least one of a memory, a storage device, a hardware processor or a graphics processing unit, a second base-panel interface to enable electronic communications between the base computer component and the second panel, the base panel to be mechanically coupled to the first and second panels in a clamshell orientation.

Example 10 includes a replaceable front display panel for a computing device, the front display panel comprising a front housing, display cover glass, a display panel, display electronics, and a first zipper component, the first zipper component to be mechanically connected to a second zipper component a rear display panel to physically couple the replaceable front display panel to the rear display panel.

Example 11 includes the replaceable front display panel of example 10, further including a panel-panel interface for enabling electronic communications between the replaceable front display panel and the rear display panel.

Example 12 includes the replaceable front display panel of example 10, wherein the first zipper component and the second zipper component form a waterproof seal when mechanically connected.

Example 13 includes the replaceable front display panel of example 10, wherein a base computer component is included in a base panel, the base panel connectable to at least one of the replaceable front display panel and the rear display panel via a hinge.

Example 14 includes a replaceable rear display panel for a computer display, the replaceable rear display panel comprising a back housing, and a first zipper component, the first zipper component to be mechanically coupled to a second zipper component of a front display panel to physically couple the replaceable rear display panel to the front display panel.

Example 15 includes the replaceable rear display panel of example 14, further including an antenna and an image capture device.

Example 16 includes the replaceable rear display panel of example 14, further including a panel-panel interface to enable electronic communications between the front display panel and the replaceable rear display panel.

Example 17 includes the replaceable rear display panel of example 14, further including a base-panel interface to enable electronic and mechanical communication between a base panel and the replaceable rear display panel.

Example 18 includes the replaceable rear display panel of example 14, wherein the first zipper component and the second zipper component form a waterproof seal when mechanically connected.

Example 19 includes the replaceable rear display panel of example 14, further including a base computer component in communication with a base-panel interface on the replaceable rear display panel.

Example 20 includes the replaceable rear display panel of example 19, wherein the base computer component is included in a base panel, the base panel connectable to at least one of the replaceable rear display panel and the front display panel via a hinge.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A separable electronics device comprising;
a first panel having a first zipper component, the first panel including a front housing, display cover glass, a display panel, display electronics, and a first panel-panel interface, wherein the first zipper component is located along a first perimeter of the first panel; and
a second panel having a second zipper component, the second panel including a back housing, and a second panel-panel interface, wherein the second zipper component is located along a second perimeter of the second panel, and wherein the first panel and the second panel are physically coupled by a mechanical connection of the first zipper component and the second zipper component between the first perimeter and the second perimeter.

2. The separable electronics device of claim 1, wherein the second panel further includes an antenna, an image capture device, and a base-panel interface.

3. The separable electronics device of claim 2, wherein the base-panel interface enables electronic and mechanical communications between a base panel and the second panel.

4. The separable electronics device of claim 1, wherein the first zipper component and the second zipper component form a waterproof seal around the separable electronics device when mechanically connected.

5. The separable electronics device of claim 1, wherein the separable electronics device is a computer display.

6. The separable electronics device of claim 1, wherein the first panel-panel interface and the second panel-panel interface, when electrically coupled, enable electronic communications between the first panel and the second panel.

7. The separable electronics device of claim 1, wherein the second panel further includes a base computer component including at least one of a memory, a storage device, a hardware processor, or a graphics processing unit.

8. The separable electronics device of claim 7, wherein the base computer component is in communication with a base-panel interface of the second panel.

9. The separable electronics device of claim 1, wherein the second panel further includes a first base-panel interface, and further including a base panel including:
a base computer component including at least one of a memory, a storage device, a hardware processor or a graphics processing unit; and
a second base-panel interface to enable electronic communications between the base computer component and the second panel, the base panel to be mechanically coupled to the first and second panels in a clamshell orientation.

10. The separable electronics device of claim 1, wherein the first zipper component is located along an entire length of the first perimeter of the first panel, and the second zipper component is located along an entire length of the second perimeter of the second panel.

11. The separable electronics device of claim 1, wherein the first zipper component and the second zipper component run along the first perimeter and the second perimeter in a direction perpendicular to a plane of the first panel and the second panel.

12. A replaceable front display panel for a computing device, the replaceable front display panel comprising:
a front housing;
display cover glass;

a display panel;

display electronics; and a first zipper component, the first zipper component located along a first perimeter of the replaceable front display panel to be mechanically connected to a second zipper component located along a second perimeter of a rear display panel to physically couple the replaceable front display panel to the rear display panel between the first perimeter and the second perimeter.

13. The replaceable front display panel of claim 12, further including a panel-panel interface for enabling electronic communications between the replaceable front display panel and the rear display panel.

14. The replaceable front display panel of claim 12, wherein the first zipper component and the second zipper component form a waterproof seal when mechanically connected.

15. The replaceable front display panel of claim 12, wherein a base computer component is included in a base panel, the base panel connectable to at least one of the replaceable front display panel and the rear display panel via a hinge.

16. A replaceable rear display panel for a computer display, the replaceable rear display panel comprising:

a back housing; and a first zipper component, the first zipper component located along a first perimeter of the replaceable rear display panel to be mechanically connected to a second zipper component located along a second perimeter of a front display panel to physically couple the replaceable rear display panel to the front display panel between the first perimeter and the second perimeter.

17. The replaceable rear display panel of claim 16, further including a panel-panel interface to enable electronic communications between the front display panel and the replaceable rear display panel.

18. The replaceable rear display panel of claim 16, further including a base-panel interface to enable electronic and mechanical communication between a base panel and the replaceable rear display panel.

19. The replaceable rear display panel of claim 16, wherein the first zipper component and the second zipper component form a waterproof seal when mechanically connected.

20. The replaceable rear display panel of claim 16, further including a base computer component in communication with a base-panel interface on the replaceable rear display panel.

* * * * *